US006760804B1

(12) United States Patent
Hunt et al.

(10) Patent No.: US 6,760,804 B1
(45) Date of Patent: Jul. 6, 2004

(54) APPARATUS AND METHOD FOR PROVIDING AN INTERFACE BETWEEN LEGACY APPLICATIONS AND A WIRELESS COMMUNICATION NETWORK

(75) Inventors: Elwin G. Hunt, Sandy, UT (US); William Raines, Sandy, UT (US); R. Kenin Page, Sandy, UT (US)

(73) Assignee: 3Com Corporation, Santa Clara, CA (US)

( * ) Notice: Subject to any disclaimer, the term of this patent is extended or adjusted under 35 U.S.C. 154(b) by 432 days.

(21) Appl. No.: 09/954,113

(22) Filed: Sep. 11, 2001

(51) Int. Cl.[7] .................. G06F 9/455; G06F 13/42; G06F 15/173; G06F 19/00; H04Q 7/20
(52) U.S. Cl. .................. 710/313; 710/105; 709/223; 703/27; 370/310
(58) Field of Search .................. 710/64, 100, 313, 710/105, 300, 305; 709/223, 217, 218; 703/24–27; 370/466, 310; 455/426.1, 426.2; 711/203

(56) References Cited

U.S. PATENT DOCUMENTS

| 5,790,895 | A | | 8/1998 | Krontz et al. ............... 395/884 |
| 5,812,820 | A | | 9/1998 | Loram ........................ 395/500 |
| 5,867,666 | A | * | 2/1999 | Harvey ....................... 709/239 |
| 6,230,118 | B1 | * | 5/2001 | Bader et al. .................. 703/24 |
| 6,330,599 | B1 | * | 12/2001 | Harvey ....................... 709/223 |
| 6,430,395 | B2 | * | 8/2002 | Arazi et al. ................. 455/41.2 |

OTHER PUBLICATIONS

"Communication protocol for virtual cellular network (VCN)" by Hwa–Jong Kim and Won–Young Jeong (abstract only).*
"Virtual cellular network: a new wireless communications architecture with multiple access ports" by Hwa Jong Kim and J.P. Linnartz (abstract only).*

* cited by examiner

Primary Examiner—Gopal C. Ray

(57) ABSTRACT

An apparatus and method for interfacing legacy applications with a wireless communication network. Specifically, the present invention discloses an integrated hardware device that creates and manages a virtual serial communication port. The virtual port is presented to legacy applications and an operating system in a computer system as a serial communication port having a UART device. An interface application ensures legacy application compatibility with the wireless communication standard, including a Bluetooth communication standard. The interface application converts outgoing data from the legacy application into a format associated with the Bluetooth communication standard. The interface application converts incoming data from a format compatible with the wireless communication standard to a format compatible with a bus and the legacy application located on the computer system. The virtual serial communication port and the integrated hardware device have device stacks compliant with a Windows (TM) driver model (WDM).

35 Claims, 8 Drawing Sheets

APPARATUS AND METHOD FOR PROVIDING AN INTERFACE BETWEEN LEGACY APPLICATIONS AND A WIRELESS COMMUNICATION NETWORK

BACKGROUND OF THE INVENTION

1. Field of the Invention

The present invention relates to the field of wireless communications. More specifically, the present invention relates to providing an interface between legacy applications and the protocol associated with a wireless communication network. Moreover, the present invention relates to a hardware and software interface between legacy applications and the Bluetooth communication standard.

2. Related Art

Wireless communication technologies allow for the replacement of the many cables that connect one physical device to another physical device with a wireless communication link. For example, printers, personal digital assistants (PDAs) or handheld computers, personal desktop computers, fax machines, keyboards, joysticks and virtually any other digital device can be coupled together as part of a wireless communication network.

The wireless communication network provides a universal bridge to data networks, a peripheral interface, and a mechanism to form small private ad hoc groupings of connected devices away from fixed network infrastructures. In other words, instead of transferring data over physical cable connections, data is transferred over the wireless communication network.

However, software applications written before the advent of any wireless communication standard may not be compatible with the protocol associated with the wireless communication standard. These applications that are not compatible are referred to as legacy software applications. As such, outgoing data from legacy software applications cannot be transferred across the wireless communication network. At the very least, the data transferred over the wireless communication network will arrive in a format that is incompatible with the receiving device and cannot be read or understood by the legacy application.

Additionally, incoming data that is in a format associated with a protocol of the wireless communication network will not be compatible with the legacy software application. As such, the legacy software application will not be able to read or understand the incoming data.

Furthermore, serial communication ports previously were used to make a wired serial connection. The serial communication port was associated with a remotely located hardware device that could perform a single function or multiple functions. In other words, a piece of hardware that promoted serial communication would be associated with or configured to a single communication port. There would be a one-to-one relationship between the remotely located hardware device and the serial communication port.

In a wireless communication network, devices that are associated with the network at one moment may not be associated with the network at another moment. The devices have the capability to roam between different wireless communication networks, or may just roam out the range of the wireless communication network. If a serial communication port on a local device were associated with a remote device that had roamed out of the wireless network, then the serial communication port would be rendered useless.

Furthermore, when a local electronic device containing the legacy serial application is booting up its operating system, the remote device associated with the serial communication port may not be connected to the local electronic device. As such, the serial port would not be initialized or recognized by the operating system of the local device. This one-to-one relationship would severely limit the performance of an local electronic device that could be coupled to multiple devices over a wireless communication network.

Thus, a need exists for an apparatus and method for ensuring legacy application compatibility with a protocol or standard that is associated with a wireless communication network. Another need exists for an apparatus and method that meets the above need and which provides for a communication port that allows for the roaming of remote devices.

SUMMARY OF THE INVENTION

The present invention provides an apparatus and method for providing an interface between legacy software applications and a wireless communication network. The present invention achieves the above accomplishment by providing for virtual communication ports that associate with a particular functionality and not a specific device or piece of hardware.

Specifically, the present invention discloses a software method that creates and manages virtual serial communication ports. The virtual ports are presented to legacy applications and an operating system in a computer system as a serial communication ports having a UART device. An interface application ensures legacy application compatibility with the wireless communication standard, including a Bluetooth communication standard. The virtual serial ports may be dynamically created or detected by user selection of desired functionality.

The interface application converts outgoing data from the legacy application into a format associated with the Bluetooth communication standard. The interface application converts incoming data from a format compatible with the wireless communication standard to a format compatible with a bus and the legacy application located on the computer system.

The device stack associated with the virtual serial communication port includes a virtual port functional device object (FDO), in accordance with one embodiment of the present invention. This FDO represents the virtual port to a driver of the virtual port that is contained in the interface device. The virtual port provides basic port management of the virtual port but passes all communication calls to the parent virtual bus driver associated with the interface device. Also included in the device stack of the virtual port is a physical device object (PDO) that represents a physical device on the virtual bus located on the local computer system containing the legacy application.

The device stack associated with the interface device that is hardware based includes a interface device FDO, in accordance with one embodiment of the present invention. This FDO represents the interface device to a driver of the interface device. Also included in the device stack of the interface device is a PDO that represents the interface device to a bus located on the local computer system containing the legacy application.

The interface device is capable of supporting multiple virtual serial communication ports. Each of the virtual ports emulate a serial communication port for a wired connection that includes a UART device. The integrated interface device is capable of mapping incoming and outgoing data to the particular virtual serial communication port.

These and other objects and advantages of the present invention will no doubt become obvious to those of ordinary skill in the art after having read the following detailed description of the preferred embodiments which are illustrated in the various drawing figures.

DETAILED DESCRIPTION OF THE INVENTION

Figure 1:
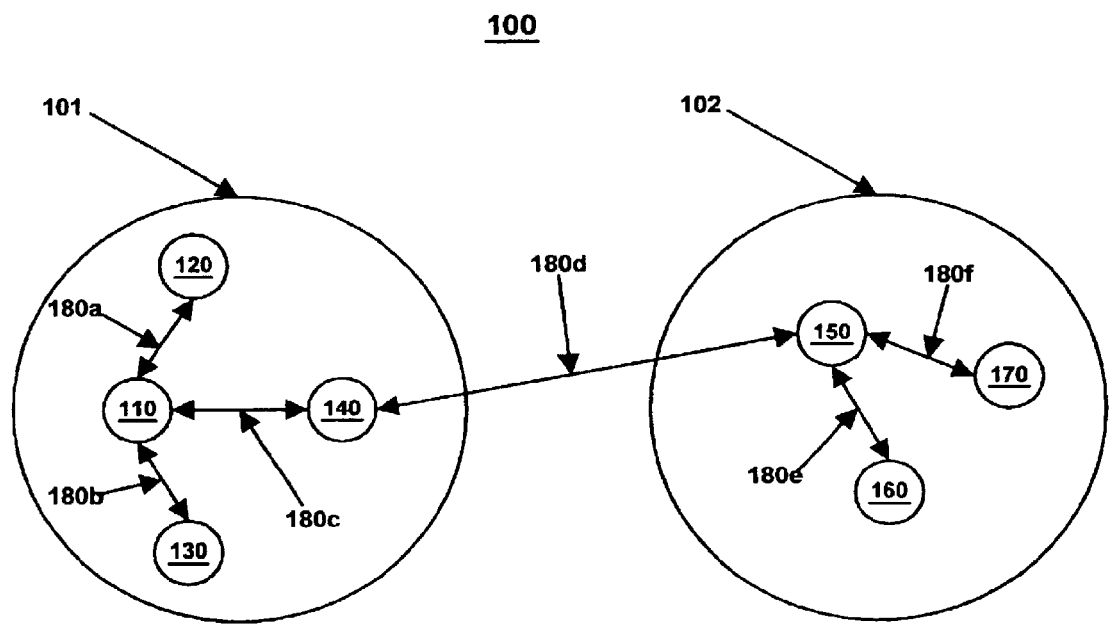
FIG. 1 illustrates a network of devices coupled using wireless connections in accordance with one embodiment of the resent invention.

Reference will now be made in detail to the preferred embodiments of the present invention, an apparatus and method for providing legacy software application compatibility with protocols associated with wireless communication networks, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result.

The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "processing," or "computing," or "translating," or "calculating," or "determining," or "scrolling," or "displaying," or "recognizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Apparatus and Method for Transferring and Displaying Digital Images in a Bluetooth Wireless Communication Network Some embodiments of the present invention are discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices. The Bluetooth technology allows cables that connect devices to one another to be replaced with short-range radio links. However, it is appreciated that the present invention may be utilized with devices and systems coupled using technologies and/or protocols different from Bluetooth, including but not limited to infrared communications links as defined by the Infrared Data Association (IrDA)

While embodiments of the present invention are described in a Bluetooth environment, it is appreciated that other embodiments of the present invention are well suited to protocols associated with other wireless communication standards, such as the IEEE 802.11 wireless communication standard.

In the parlance of Bluetooth, a collection of devices connected in a Bluetooth system is referred to as a "piconet"

or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

FIG. 1 illustrates the topology of a network 100 of devices coupled using wireless connections in accordance with one embodiment of the present invention. Devices 110, 120, 130 and 140 are coupled in piconet 101 using wireless connections 180a–c. Similarly, devices 150, 160 and 170 are coupled in piconet 102 using wireless connections 180e and 180f. Piconet 101 and piconet 102 are coupled using wireless connection 180d. Devices 110–170 can be printers, personal digital assistants (PDAs), desktop computer systems, laptop computer systems, cell phones, fax machines, keyboards, joysticks and virtually any other electronic device. In the present embodiment, devices 110–170 are Bluetooth devices; that is, they are equipped with a Bluetooth radio transceiver, or they are adapted to communicate with Bluetooth devices ("Bluetooth-enabled") . That is, the Bluetooth radio transceiver may be integrated into a device, or it may be coupled to a device.

Figure 2:
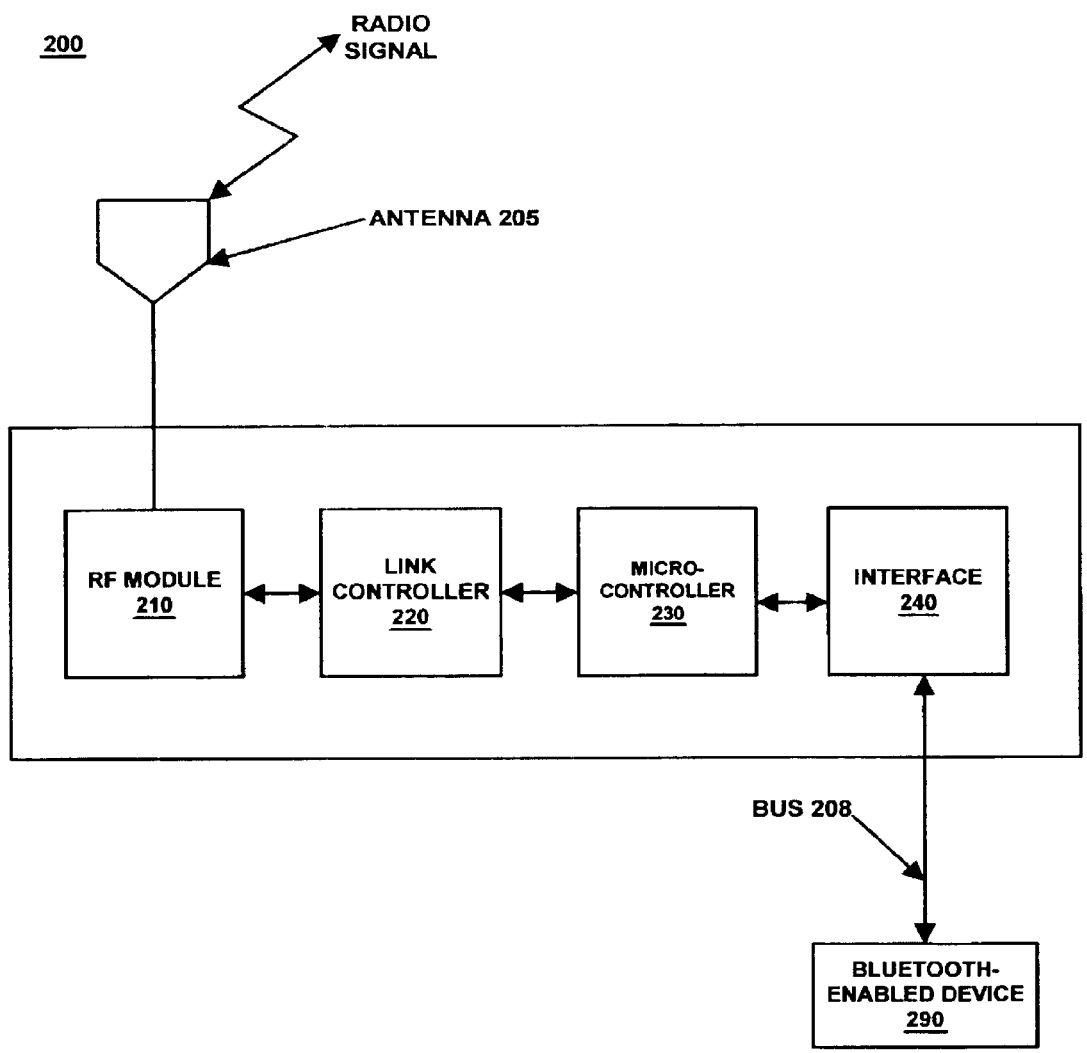
FIG. 2 illustrates a block diagram showing one embodiment of a Bluetooth wireless transceiver in accordance with one embodiment the present invention.

FIG. 2 is a block diagram of one embodiment of a transceiver 200 in accordance with the present invention. In a preferred embodiment (the "Bluetooth embodiment"), transceiver 200 is a Bluetooth device comprising a digital component (e.g., a Bluetooth controller) and an analog component (e.g., a Bluetooth radio).

In the present embodiment, transceiver 200 comprises an antenna 205 for receiving or transmitting radio signals, a radio frequency (RF) module 210, a link controller 220, a microcontroller (or central processing unit) 230, and an external interface 240. In the present embodiment, transceiver 200 is coupled by a system bus 208 to a Bluetooth-enabled device 290 (e.g. , a host device such as a computer system or similar intelligent electronic device, a wireless digital picture device, a digital imaging device, a digital camera, a PDA, a printer, a fax machine, etc.). However, it is appreciated that in another embodiment, transceiver 200 may be integrated into Bluetooth-enabled device 290.

In the Bluetooth embodiment, RF module 210 is a Bluetooth radio. The Bluetooth radio can provide: a bridge to existing data networks, a peripheral interface, and a mechanism to form piconets of connected devices away from fixed network infrastructures (see FIG. 2).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption. Link controller 220 has two major states: standby and connection. In addition, there are seven substates: page, page scan, inquiry, inquiry scan, master response, slave response, and inquiry response. The substates are interim states that are used to add new slaves to a piconet (FIG. 1).

Continuing with reference to FIG. 2, in one embodiment, microcontroller 230 is an application specific integrated circuit (ASIC). In the Bluetooth embodiment, microcontroller 230 is a separate central processing unit (CPU) core for managing transceiver 200 and for handling some inquiries and requests without having to involve the host device. In the Bluetooth embodiment, microcontroller 230 runs software that discovers and communicates with other Bluetooth devices via the Link Manager Protocol (LMP) The LMP provides a number of services including sending and receiving of data, inquiring of and reporting a name or device identifier, making and responding to link address inquiries, connection setup, authentication, and link mode negotiation and setup. The LMP also can be used to place transceiver 200 in "sniff" mode, "hold" mode, "park" mode or "standby" mode.

The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

In the present embodiment, before any connections between Bluetooth devices are created, all devices are in standby mode; that is, the standby mode is the default mode of a Bluetooth device. The standby mode is a low power mode in which an unconnected unit "listens" for messages at a regular rate (generally, every 2.56 seconds according to the Bluetooth specification) on a set of hop frequencies defined for that unit. Link controller 220 may leave the standby mode to scan for page or inquiry messages, or to transmit a page or inquiry message. When responding to a page message, the Bluetooth device enters the connection state as a slave. When carrying out a successful page attempt, the Bluetooth device enters the connection state as a master.

A "discoverable device" is a Bluetooth device in range that will respond to an inquiry (normally in addition to responding to a page). A "connectable device" is a Bluetooth device in range that will respond to a page.

With reference still to FIG. 2, in the present embodiment, interface 240 is for coupling transceiver 200 to Bluetooth-enabled device 290 in a suitable format. Transceiver 200 may be coupled by system bus 208 to Bluetooth-enabled device 290 (e.g., a host device such as a computer system or similar intelligent electronic device, a PDA, a printer, a fax machine, etc.), or transceiver 200 may be integrated into Bluetooth-enabled device 290. In the present embodiment, interface 240 runs software that allows transceiver 200 to interface with the operating system of Bluetooth-enabled device 290. In accordance with the present invention, interface 240 may be any of a variety of physical bus interfaces, including but not limited to a Universal Serial Bus (USB) interface, a Personal Computer (PC) Card interface, a CardBus, Peripheral Component Interconnect (PCI) local bus, a mini-PCI interface, a Personal Computer Memory Card International Association (PCMCIA) interface, an Industry Standard Architecture (ISA) interface, or a RS-232 interface.

Figure 3:
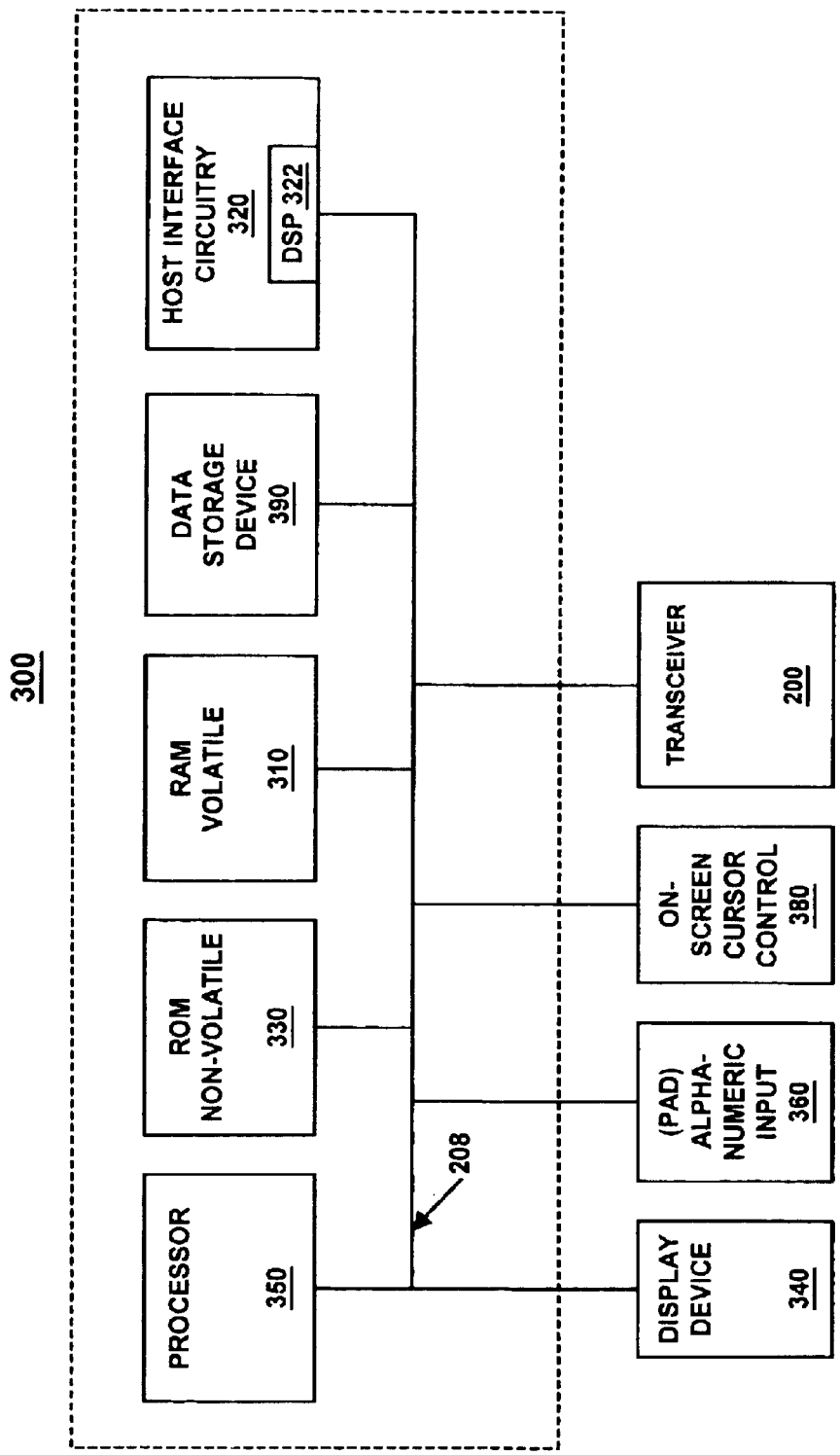
FIG. 3 is a block diagram of an exemplary electronic device coupled to the Bluetooth wireless transceiver of FIG. 2 in accordance with one embodiment of the present invention.

Apparatus and Method for Interfacing Legacy Applications With a Wireless Communication Network With reference now to FIG. 3, portions of the interfacing of legacy applications with a protocol associated with a wireless communication network method and apparatus are comprised of computer-readable and computer executable instructions which reside, for example, in computer-usable media of a computer system. FIG. 3 illustrates an exemplary electronic device 300 with wireless capabilities used to perform the interface between the legacy software application and the wireless network protocol in accordance with embodiments of the present invention. It is appreciated that device 300 of FIG. 3 is exemplary only and that the present invention can operate within a number of different intelligent electronic devices, such as a desktop computer system, a laptop computer system, a personal digital assistant (PDA), etc. In the Bluetooth embodiment, electronic device 300 is a Bluetooth enabled device coupled with a Bluetooth transceiver, such as transceiver 200.

Continuing with reference to FIG. 3, electronic device 300 can include a computer controlled software application for the interfacing of legacy applications with a wireless communication network. In general, electronic device 300 includes an address/data bus 208 for communicating information, a central processor 350 coupled with the bus 208 for processing information and instructions, a volatile memory 310 (e.g., random access memory (RAM), static RAM, dynamic RAM, etc.) coupled with the bus 208 for storing information and instructions for the central processor 350, and a non-volatile memory 330 (e.g., read only memory (ROM), programmable ROM, flash memory, EPROM, EEPROM, etc.) coupled with the bus 208 for storing static information and instructions for the processor 350. The electronic device 300 also includes a data storage device 390 (e.g., a compact memory device such as a smart stick, flash memory, or a memory stick) coupled with the bus 208 for storing information and instructions. Data storage device 390 can be removable.

The electronic device 300 also contains a viewing screen 340 coupled to the bus 208 for displaying digital images to the user. The viewing screen 340 utilized with electronic device 300 may be a liquid crystal display (LCD) device, a cathode ray tube (CRT), a field emission display device (also called a flat panel CRT), or other display device suitable for generating graphic images and alphanumeric characters recognizable to the user.

The electronic device 300 also includes a signal transmitter/receiver (transceiver) device 200, which is coupled to bus 208 for providing a wireless radio (RF) communication link between electronic device 300 and other wireless devices. In the Bluetooth embodiment, transceiver 200 is compliant with the Bluetooth specification (see FIG. 2).

It is appreciated that transceiver 200 is well-suited to be implemented in a wide variety of ways. For example, transceiver 200, in another embodiment, can be an Input/Output (I/O) interface (not shown) for providing a communication link between device 300 and a network environment. The (I/O) interface allows electronic device 300 to transmit and receive digital content with other electronic devices in a wireless or wired environment. In still another embodiment, the I/O interface could be implemented as a modem. Further the I/O interface could support an IR port, serial port, USB port, PC-Card, etc.

In one embodiment, electronic system 300 of FIG. 3 includes host interface circuitry 320 coupled to bus 208 in a Bluetooth communication environment. Host interface circuitry 320 includes an optional digital signal processor (DSP) 322 for processing data to be transmitted or data that are received via transceiver 200. Alternately, processor 350 can perform some or all the functions performed by DSP 322.

Also included in electronic device 300 is an optional alphanumeric input device 360, in another embodiment of the present invention. Alphanumeric input device 360 can communicate information and command selections to processor 350 via bus 208. In one implementation, alphanumeric input device 360 is a touch screen device. Alphanumeric input device 360 is capable of registering a position where contact is made.

In still another embodiment of the present invention, electronic device 300 also includes an optional cursor control or directing device (on-screen cursor control 380) coupled to bus 208 for communicating user input information and command selections to processor 350. In one implementation, on-screen cursor control device 380 is a touch screen device incorporated with viewing screen 340. On-screen cursor control device 380 is capable of registering a position on viewing screen 340 where a stylus element (not shown) makes contact.

Figure 4:
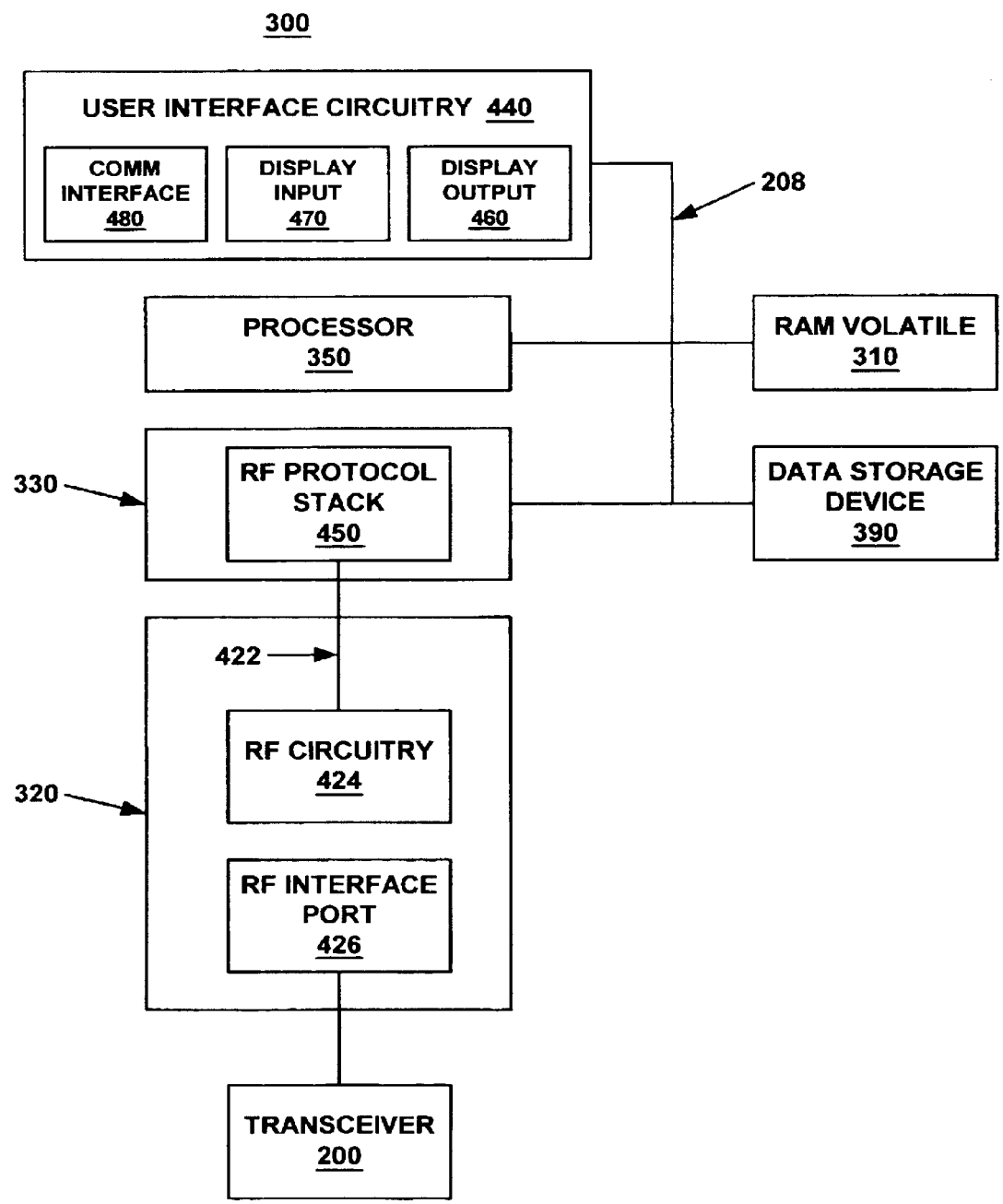
FIG. 4 is a block diagram showing features of an exemplary electronic device of FIG. 3, in accordance with one embodiment of the present invention.

FIG. 4 is a block diagram showing additional features of electronic device 300 in accordance with one embodiment of the present invention. User interface circuitry 440 is coupled to processor 350 via bus 208. User interface circuitry includes hardware and software components that provide user input and output resources for functions performed by processor 350. In the present embodiment, user interface circuitry 440 includes a display output 460, a display input 470, and communication interface 480.

In this embodiment, display output 460 receives digital information representing graphical information from processor 350, and converts the information to a graphical display, such as text and/or images, for display on viewing screen 340 (FIG. 3), for example. Display input 470 may receive data inputs, such as graphical data inputs, from a user. The graphical data inputs can be entered by the user with a stylus element (not shown) on the viewing screen 340 that is optionally pressure-sensitive (specifically, on-screen cursor control device 380, FIG. 3) or the alphanumeric input device 360 (FIG. 3).

In one embodiment of the present invention, the communication interface 480 is a serial communication port, but could also alternatively be of any of a number of well-known communication standards and protocols, e.g., parallel, SCSI (small computer system interface), Firewire (IEEE 1394), Ethernet, Universal Serial Bus (USB), Personal Computer Memory Card International Association (PCMCIA), etc.

Host interface circuitry 320 is coupled to processor 350 via bus 208. In the Bluetooth embodiment, host interface circuitry 320 (or link interface circuitry or data interface circuitry) illustrates, but is not limited to, an RF interface port 426 for establishing a wireless link to another device.

In the present embodiment, RF circuitry 424 converts signals to radio frequency output and accepts radio frequency input via RF interface port 426. In the Bluetooth embodiment, RF interface port 426 is a Bluetooth transceiver 200 (FIG. 2). RF signals received by RF circuitry 424 are converted to electrical signals and relayed to RF protocol stack 450 via connection 422. Processor 350 is capable of executing RF protocol stack 450.

Figure 5:
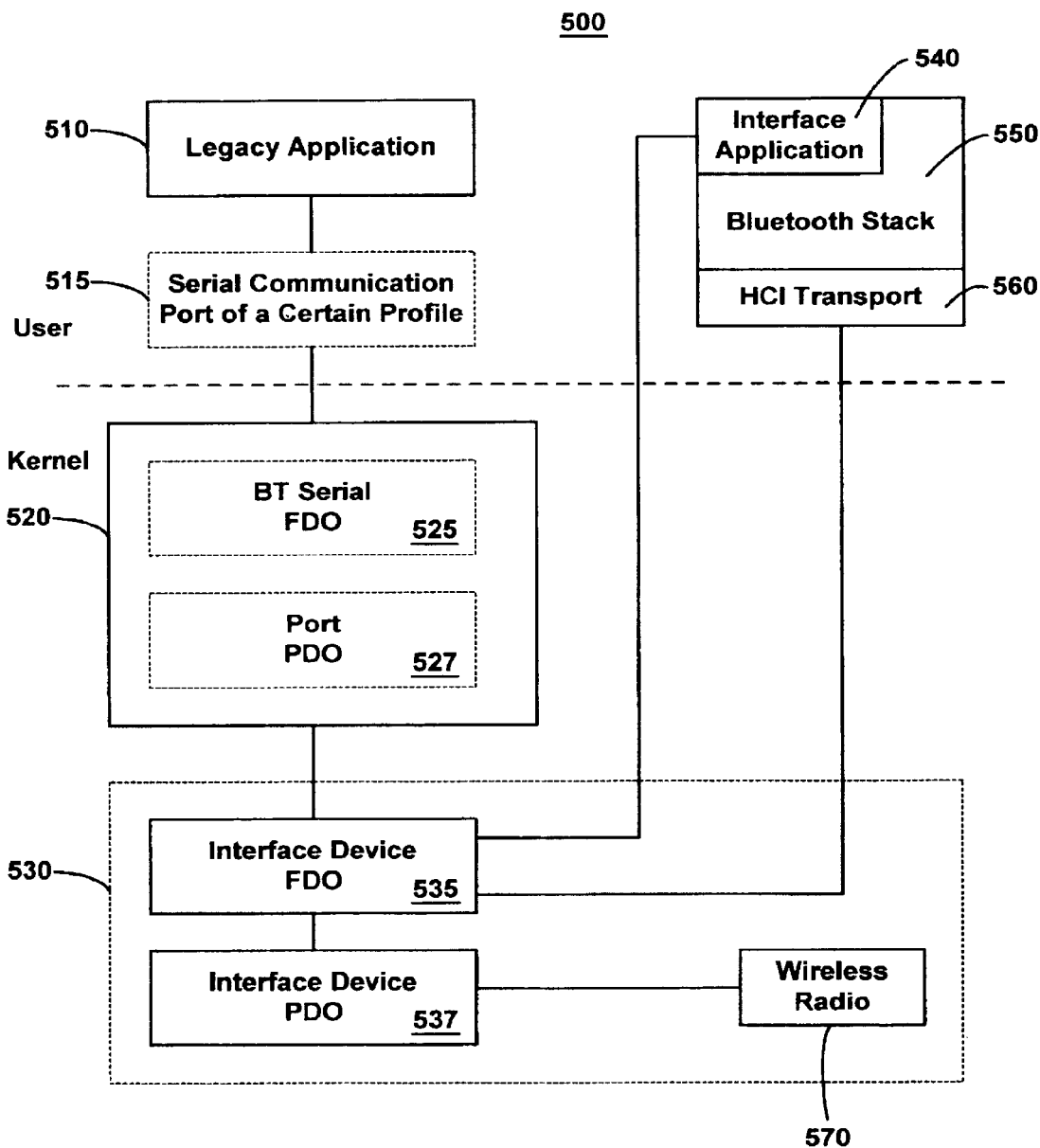
FIG. 5 is a block diagram of an exemplary electronic device with wireless capabilities showing a virtual serial communication port and its device drivers, and the parent driver associated with the interface device, in accordance with one embodiment of the present invention.

Multi-function serial port devices and drivers are common in communication networks. However, the creation of a serial port that is independent of the type or amount of underlying hardware is unique. FIG. 5 illustrates a architecture and data flow diagram for an exemplary electronic device 500 with wireless capabilities that provides interfacing capabilities between a legacy software application 510 that is not compatible with protocol associated with a wireless communication network or standard, such as the Bluetooth standard, in accordance with one embodiment of the present invention.

A serial communication port, as represented by port 515, is presented to the user and the legacy serial application 510 at the user level as a fully recognized and initialized serial port typical of a wired connection to a remote device. However, instead of being connected to a dedicated remote device, the serial communication port 515 is of a selected Bluetooth profile, and may or may not necessarily be coupled with a remote electronic device with that particular profile at any particular time.

The Bluetooth profiles include but are not limited to profiles such as a serial host communication port, a serial client communication port, a fax client communication port, a DUN client communication port, local area network (LAN) access point (LAP) client communication port, and a Transmission Control Protocol/Internet Protocol interface.

The serial communication port 515 is not associated particularly to a specific hardware device. This is because in a wireless communication network, multiple devices with multiple functionalities or profiles enter and leave the local area network (LAN), or piconet in a Bluetooth environment, associated with the electronic device 500. Instead, each initialized serial port is flexibly configured to support a particular profile. This allows a user of electronic device 500 to select between multiple devices that are currently within its LAN, or piconet in a Bluetooth environment.

In one embodiment, each client port can be configured to connect to a specific remote device. In another case, the client ports are configured to prompt the user to select a remote device when the port is opened by a legacy application. The remote device provides the same profile and functionality as associated with the serial communication port 515. In addition, the serial communication port 515 can be edited to change its particular profile or functionality, and to select another remote device for establishing a connection for the transfer of data.

The serial communication port 515 at the front end is actually a virtual serial communication port 520 that exists at the kernel level of the electronic device 500. The virtual communication port 520 is created by an integrated hardware interface device 530. In one embodiment, the virtual communication port 520 emulates a serial communication port that includes a universal asynchronous receiver/transmitter (UART) or modem. The UART provides shift registers for parallel to serial and for serial to parallel conversions of data and all the flow control or handshaking required to control the flow of data to and from the electronic device 500 and some other remote electronic device.

In another embodiment, the interface device 530 is a Personal Computer Memory Card International Association (PCMCIA) card that is coupled to the electronic device 500.

In another embodiment, the interface device 530 is a Universal Serial Bus (USB) device.

While these embodiments envision the present invention as having an interface device compatible with the PCMCIA bus or USB bus, it is appreciated that other embodiments of the present invention can utilize other bus standards, such as Peripheral Communication Interconnect (PCI), Extended Industry Standard Architecture (EISA), or IEEE 802.11, IEEE 1394, etc.

The interface device 530 creates the virtual serial communication port 520. A virtual port physical device object (PDO) 527 is created that effectively represents a serial communication port to the user or other applications on the electronic device 500, in accordance with one embodiment of the present invention. Because the virtual serial port 520 is exposed as a regular serial device on the operating system associated with electronic device 500, other system objects such as TCP/IP, or Point to Point Protocol (PPP) are able to interact with and use the virtual port 520.

A functional device driver associated with the virtual port 520 handles basic device management functions and creates a function device object (FDO) 525 on the device stack. The FDO 525 represents the logical functionality of the virtual port 520. Since only basic device management is handled at the virtual port 520, all communication calls are essentially passed on to the parent driver running the interface device 530.

In one embodiment of the present invention, the FDO 525 associated with the virtual port 520 is actually a serial filter FDO. The virtual port 520 is a filter that provides further functionality for the integrated hardware interface device 530. For example, the filter FDO represents the functionality of the virtual port 520 and filters input/output requests through the virtual port 520. In essence, the functional driver of the virtual port only provides basic device management and passes all communication calls to the parent driver running the interface device 530.

Similarly, the integrated hardware interface device 530 has an associated device stack. An interface device FDO 535 represents the logical functionality of the interface device 530, which includes maintaining all the communication statusing that the physical serial communication port, that is emulated by the virtual port 520, would perform. Part of the integrated functionality of the interface device 530 includes providing the necessary handshaking required to initialize a serial communication port that includes an actual universal asynchronous receiver/transmitter (UART) device or modem device.

Embodiments of the present invention disclose virtual serial communication ports and integrated hardware devices having device stacks that are compliant with a Windows (TM) driver model (WDM). These various serial filter drivers and the hardware drivers are common within the Windows (TM) operating system. However, other embodiments of the present invention are well suited to various other driver models and operating systems.

Further functions of the interface device 530 include transferring data to an interface application 540 that converts the data between a Bluetooth format and a format associated with the legacy application on the electronic device 500.

In addition, the interface device 530 provides the necessary mapping between the virtual ports and remote devices within the LAN, or piconet in a Bluetooth network, of the electronic device 500. As such, the interface device is able to transmit outgoing data signals through its wireless radio device 570 to an appropriate remote electronic device and receive incoming data signals from remote devices through the same radio device 570 and route them to the proper virtual port.

The virtual serial communication port (COM port) 520 provides legacy software application compatibility with the Bluetooth wireless communication protocol, and to other wireless communication standards or specifications. In one embodiment, a COM port is assigned during installation of the interface device 530 to allow for Dialup Networking (DUN) applications. Also, a COM port is assigned during installation to handle FAX dialout applications. Further, a COM port is assigned during installation to allow for dial less DUN connections for LAN access over PPP. A COM port is assigned during installation to handle host serial applications. Another COM port is assigned during installation to handle client serial applications.

Figure 7:
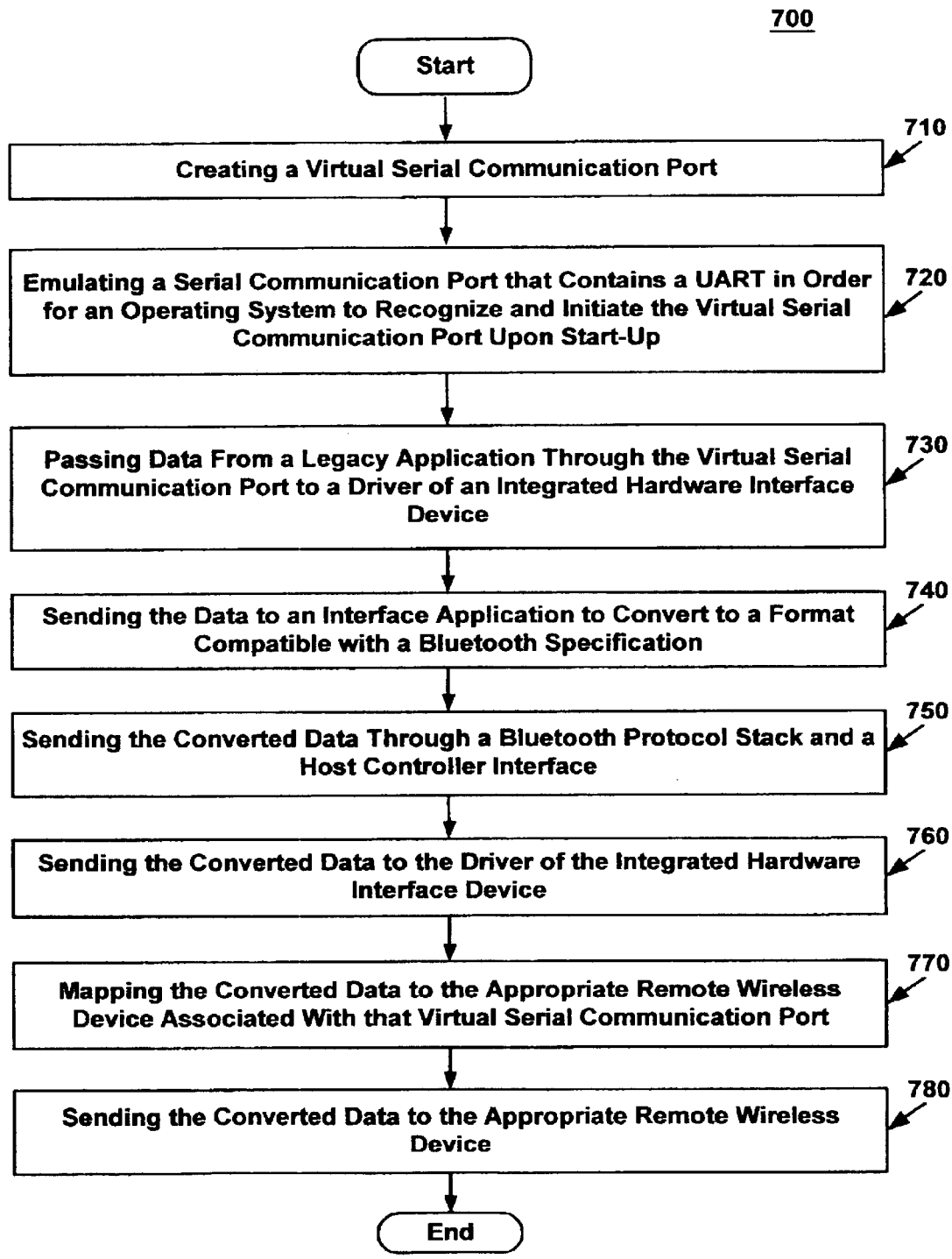
FIG. 7 is a flow diagram illustrating steps in a computer implemented method for converting outgoing data to a format associated with a wireless communication protocol, in accordance with one embodiment of the present invention.

Referring back to FIG. 5, the data flow for outgoing data begins at the legacy application 510, such as a FAX application that is not compatible with the Bluetooth wireless communication standard. Additionally, FIG. 5 illustrates the method as described in process 700 of FIG. 7 for providing interfacing between a legacy software application and a Bluetooth wireless communication standard, in accordance with one embodiment of the present invention.

The present embodiment begins by creating a virtual serial communication port as described in step 710 of process 700. The interface device creates and manages the virtual port on the electronic device with the legacy application that is not compatible with the Bluetooth specification. The interface device can create and manage multiple virtual serial communication ports if necessary.

In step 720 of process 700, the present embodiment emulates a serial communication port that contains a UART. This allows the operating system of the electronic device containing the legacy application to recognize and initiate the virtual serial port. Additionally, this emulation allows for the transfer of data to and from the virtual serial port.

The outgoing data is sent from the legacy application 510 to the serial communication port 515 that appears at the user level. The outgoing data is then sent by the present embodiment to the virtual serial communication port 520 and is essentially passed through the FDO 525 and PDO 527 in step 730. Continuing with step 730, the present embodiment then sends the outgoing data to the interface device 530.

The outgoing data signals are sent to the FDO 535 of the integrated hardware interface device 530. The interface device 530 is able to map the outgoing data from the virtual port 520 to a remote electronic device (not shown) that is a defaulted device, dedicated device, or a user selected device. The interface device 530 manages the creation and provides the software functionality for the virtual port 520 as well as other multiple virtual ports located on electronic device 500.

From here, the present embodiment in step 740 sends the outgoing data to the interface application 540 at the application level above the kernel level of the electronic device 500. The interface application 540 then converts the outgoing data from a format associated with the legacy application, into a format that is compatible with the Bluetooth wireless communication specification.

In step 750 of process 700, the present embodiment sends the converted outgoing data to the Bluetooth protocol stack 550 and the Host Controller Interface and Transport Stacks 560. From there, in step 760, the present embodiment sends the converted outgoing data back to the FDO 535 of the interface device.

In step 770 of process 700, the present embodiment maps the converted data to the appropriate remote wireless device associated with the virtual serial communication port. From there, the outgoing data is sent to the appropriate remotely located electronic device via the wireless radio 570.

Proper execution of the interface application 540 is dependent upon all drivers being loaded, and the virtual COM port 520 being defined for use with Bluetooth. A Bluetooth PC Card or USB device with wireless capabilities must be inserted and communicating with the drivers for successful operation of the interface application 540.

Figure 8:
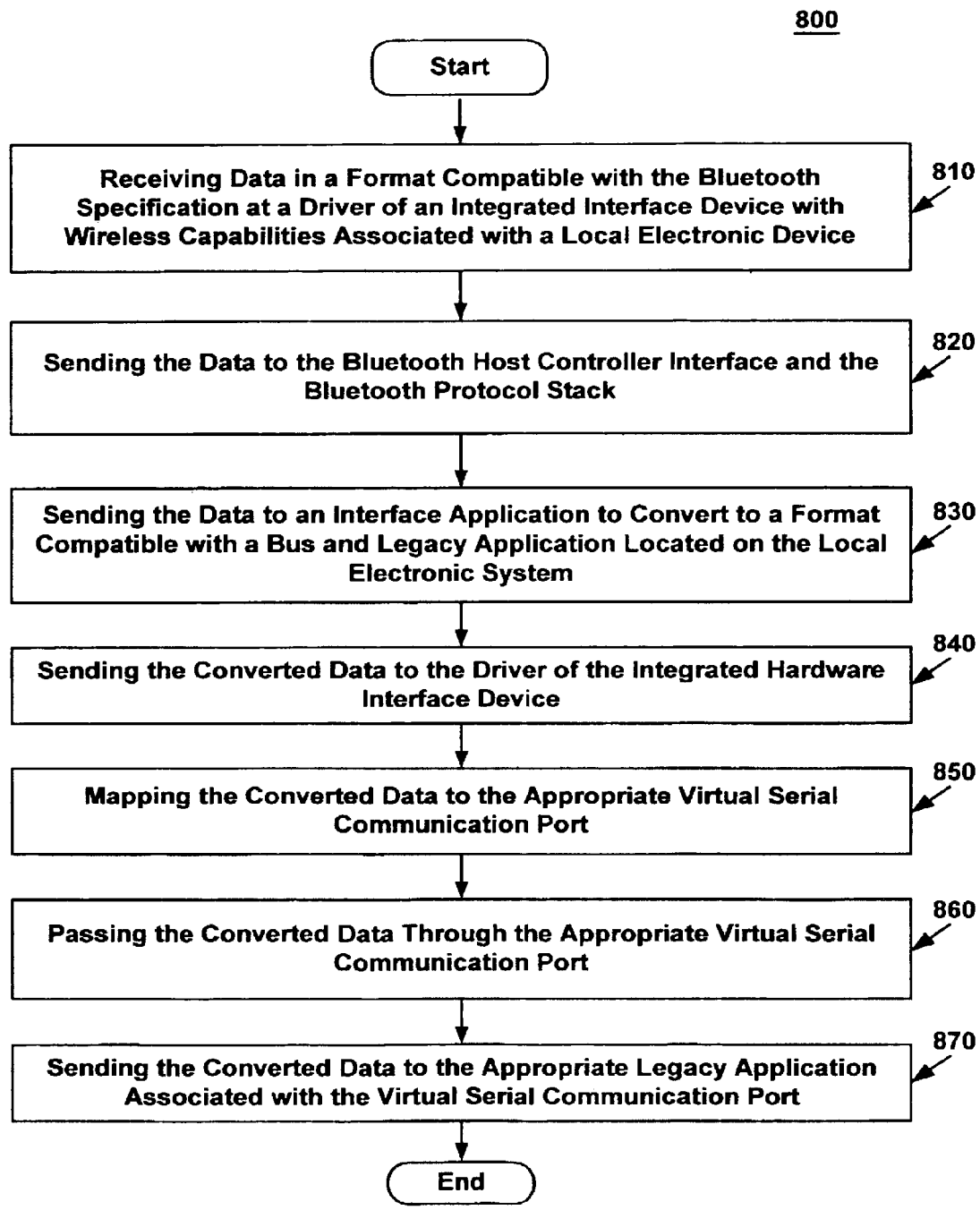
FIG. 8 is a flow diagram illustrating steps in a computer implemented method for converting incoming data to a format associated with the bus and the legacy software application located on the local electronic device with wireless capabilities, in accordance with one embodiment of the present invention.

Referring back to FIG. 5, the data flow for incoming data signals over a Bluetooth wireless communication network that are received at the electronic device 500 is basically the reverse of the flow for outgoing signals, in accordance with one embodiment of the present invention. Additionally, FIG. 5 illustrates the method as described in process 800 of FIG. 8 for providing interfacing between a legacy software application and a Bluetooth wireless communication standard, in accordance with one embodiment of the present invention.

In step 810 of process 800, the present embodiment receives incoming data at the interface device 530 via the wireless radio 570. The data is sent to the PDO 537 associated with the interface device 530. At this time, the incoming data is of a format compatible with the Bluetooth specification. This Bluetooth format is incompatible with the legacy application 510 at this time.

In step 820 of process 800, the present embodiment sends the incoming data of a Bluetooth format to the HCI and Transport protocol stacks 560 and the Bluetooth protocol stack 550. From there, in step 830, the present embodiment sends the incoming data to the interface application 540 in order to convert the incoming data from a Bluetooth format into a format compatible with the legacy application 510 and the bus on the electronic device 500. In one embodiment, this format is of a parallel format typically used on by buses on computer systems.

In step 840 of process 800, the present embodiment then sends the converted incoming data back to the FDO 535 associated with the integrated hardware interface device 530. In step 850, the converted incoming data is mapped by the present embodiment to the proper legacy application supported by an associated virtual port since the interface device can manage and control multiple virtual serial communication ports.

Upon completion of the mapping process, the present embodiment in steps 860 and 870 sends the converted incoming data via the interface device 530 via the correct path to the proper virtual port and associated legacy application. In this case, the converted incoming data is sent to the virtual port 520 and on up to the legacy application 510. The incoming data can be read and processed by the legacy application 510 since the data has been converted to a format compatible with the legacy application 510.

Figure 6:
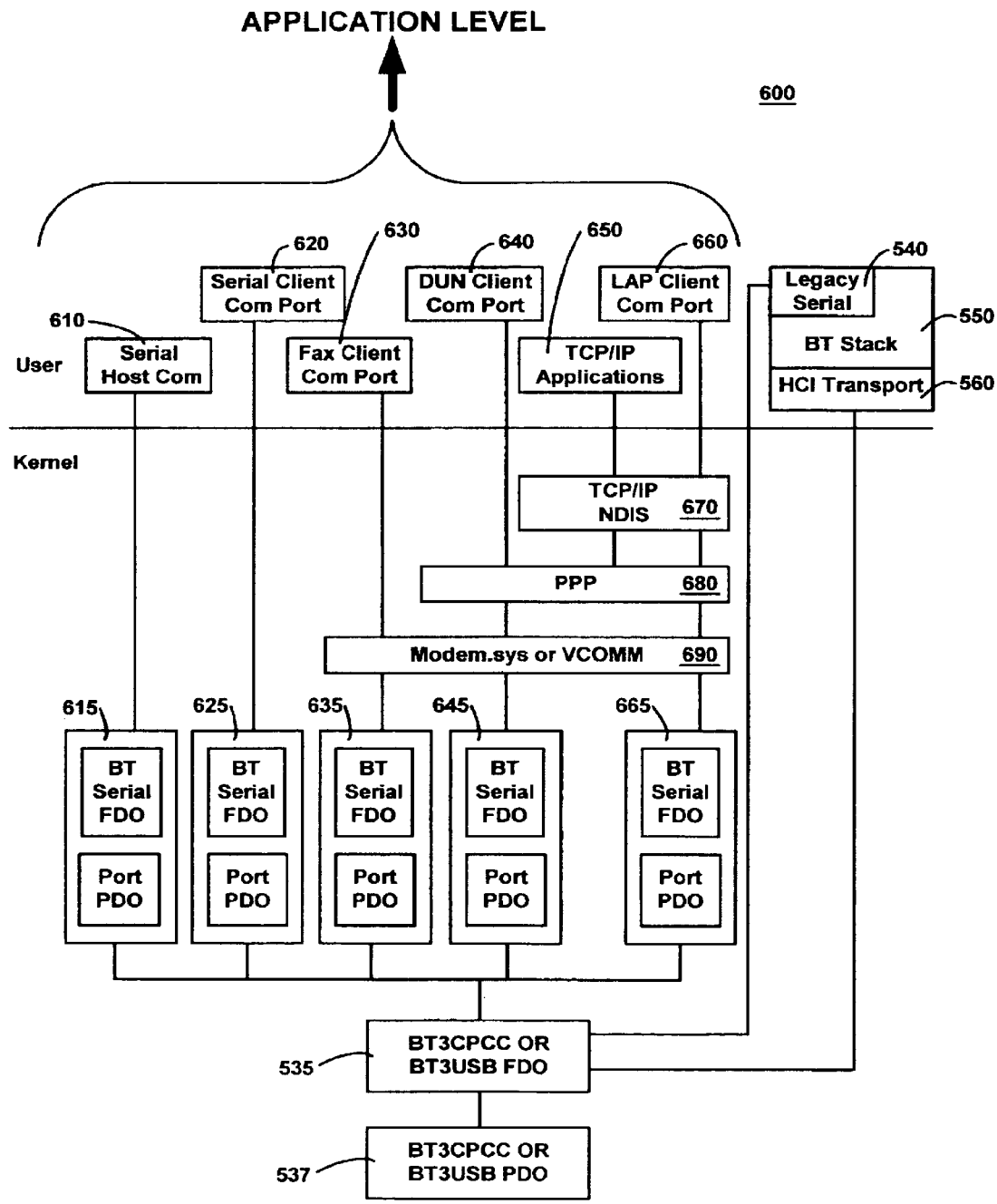
FIG. 6 is a block diagram of an exemplary electronic device with wireless capabilities showing multiple virtual communication ports and the device drivers associated with each of the virtual ports and the parent driver associated with the interface device, in accordance with one embodiment of the present invention.

FIG. 6 illustrates an block diagram illustrating the architecture and the data flow for an electronic system 600 with wireless capabilities. FIG. 6 is a projection of a single virtual port as illustrated in FIG. 5 into an electronic device capable of supporting multiple virtual ports as illustrated in FIG. 6, in accordance with one embodiment of the present invention.

At the user level, multiple serial ports are presented with specific profiles, such as serial host COM port 610, serial client COM port 620, fax client COM port 630, DUN client COM port 640, TCP/IP application interface 650, and LAN access point (LAP) COM port 660. Other embodiments of the present invention provide for other profiles existing on the electronic device 600. Each of the client and host ports are associated with possibly a legacy application that is not compatible with the Bluetooth specification.

Each of the COM ports described above are associated with a virtual serial communication port: the host port 610 is associated with virtual port 615; serial client port 620 is associated with virtual port 625; fax port 630 is associated with virtual port 635; DUN port 640 is associated with virtual port 645; and LAP port 660 is associated with virtual port 665.

Additionally, various modules containing various protocols may be inserted within the protocol stack associated with some of the communication paths for the connections between the serial communication ports presented at user level (e.g., ports 630, 640, 650, and 660) and their associated virtual serial communication ports. For example, a TCP/IP protocol module 670 is inserted above the PPP protocol module 670 and the modem.sys or VCOMM protocol module 690 in the paths connecting the ports 650 and 660 and their associated virtual serial communication ports 645 and 665 correspondingly. Since these virtual ports are exposed as regular serial devices, other system objects, like TCP/IP, PPP, VCOMM, and Modem.sys can interact with and use the virtual serial ports.

Referring back to FIG. 6, an integrated hardware interface device, as illustrated in FIG. 5 as device 530, contains a FDO 535 and PDO in its device stack. The interface device 530, as discussed previously, creates and manages each of the virtual ports (e.g., ports 615, 625, 635, 645, and 665). The interface device also provides the mapping functionality to route incoming and outgoing data to the proper virtual communication port and its corresponding legacy application, or to the appropriate remote electronic device (not shown). Additionally, the interface device coordinates data flow to the interface application 540 and the Bluetooth stack 550, and HCI and Transport stacks 560.

Thus, serial filter drivers and hardware drivers are common within the Windows operating system (OS). The hybrid implementation utilized by the present invention allows for multiple virtual COM ports to be created, exposed, managed, and used within a electronic device with Bluetooth wireless communication capabilities. This mechanism provides full legacy software application support within a Bluetooth or other wireless communication network.

While the methods of embodiments illustrated in process 700 and 800 show specific sequences and quantity of steps, the resent invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of process 700 and 800 may be implemented utilizing processor 350 and ROM memory 330 and RAM memory 310, as shown in FIG. 3. Furthermore, other types of memory storage can be utilized to accomplish the aforementioned such as a hard drive, a CD ROM, flash memory, or any compact integrated circuit memory storage device.

Hence, the present invention provides an apparatus and method for interfacing a legacy serial application with a protocol or specification associated with a wireless communication network. Also, the present invention provides an apparatus and method that achieves the above accomplishment and which also provides for virtual communication ports that are associated with a particular functionalities and not specific devices or pieces of hardware.

Embodiments of the present invention, an apparatus and method for providing an interface between legacy software applications and a wireless communication network, is thus described. While the present invention has been described in particular embodiments, it should be appreciated that the present invention should not be construed as limited by such embodiments, but rather construed according to the below claims.

What is claimed is:

1. A computer system coupled to a wireless communication network comprising:

a processor;

a memory;

a virtual serial communication port for emulating a physical serial communication port, said virtual serial communication port operating in combination with said processor and said memory;

an interface application for ensuring compatibility of a legacy application located on said computer system with a protocol associated with said wireless communication network, said interface application adapted to be communicatively coupled to said virtual serial communication port; and a bus for coupling said processor, and said memory.

2. The computer system as described in claim 1, further comprising:

an interface device including said interface application that is coupled to said bus, said interface device for creating and managing said virtual serial communication port.

3. The computer system as described in claim 2, wherein said interface device is a PC Card substantially complying with a version of the Personal Computer Memory Card International Association (PCMCIA) standard.

4. The computer system as described in claim 2, wherein said interface device is a Universal Serial Bus (USB) device.

5. The computer system as described in claim 2, wherein said virtual serial communication port further comprises:

a virtual port functional device object (FDO) representing said virtual serial communication port to a driver of said virtual serial communication port that is contained in said interface device, and for providing basic port management of said virtual port, said virtual port FDO substantially complying with a Windows (TM) driver model (WDM model); and a virtual port physical device object (PDO) for representing said virtual port to said bus, said virtual port PDO substantially complying with said WDM model.

6. The computer system as described in claim 2, wherein said interface device further comprises:

an interface device functional device object (FDO) for representing said interface device to a driver of said interface device, said interface device FDO substantially complying with a Windows (TM) driver model (WDM model); and an interface device physical device object (PDO) for representing said interface device to said bus, said interface device PDO substantially complying with said WDM model.

7. The computer system as described in claim 1, further comprising:

an operating system wherein said memory contains instructions for booting up said operating system that when executed by said processor allow said operating system to identify and initialize said virtual serial communication port.

8. The computer system as described in claim 1, wherein said protocol is substantially compliant with a version of the Bluetooth wireless communication specification.

9. The computer system as described in claim 1, wherein said physical serial communication port includes functionality of a Universal Asynchronous Receiver/Transmitter (UART) device.

10. The computer system as described in claim 9, wherein said interface application converts outgoing data from said legacy application via said virtual serial communication port to a first format substantially complying with said protocol, and converts incoming data substantially complying with said protocol into a second format compatible with said legacy application and said bus.

11. The computer system as described in claim 1, wherein said bus is taken from a group comprising:
   a Peripheral Component Interconnect (PCI) bus;
   a Personal Computer Memory Card International Association (PCMCIA) bus;
   a Universal Serial Bus (USB); and
   an IEEE 1394 bus.

12. The computer system as described in claim 1, wherein said computer system is a cellular phone.

13. The computer system as described in claim 1, wherein said computer system is a laptop computer.

14. The computer system as described in claim 1, wherein said computer system is a personal digital assistant (PDA).

15. The computer system as described in claim 1, further comprising a second virtual communication port associated with a second legacy application for emulating a second physical serial communication port, wherein said interface device maps incoming data to the appropriate serial communication port and maps outgoing data to the appropriate remote electronic device.

16. A electronic system coupled to a wireless communication network comprising:
   a virtual serial communication port for emulating a physical serial communication port;
   an interface application for ensuring compatibility of a legacy application with a protocol associated with said wireless communication network, said interface application communicatively coupled to said virtual serial communication port;
   an interface device including said interface application, said interface device for creating and managing said virtual serial communication port; and
   a bus for coupling a processor, a memory, and said interface device.

17. The electronic system as described in claim 16, wherein said interface device is a PC Card substantially complying with a version of the Personal Computer Memory Card International Association (PCMCIA) standard.

18. The electronic system as described in claim 16, wherein said interface device is a Universal Serial Bus (USB) device.

19. The electronic system as described in claim 16, wherein said protocol is substantially compliant with a version of the Bluetooth wireless communication specification.

20. The electronic system as described in claim 16, wherein said physical serial communication port includes functionality of a Universal Asynchronous Receiver/Transmitter (UART) device.

21. The electronic system as described in claim 16, wherein said interface application converts outgoing data from said legacy application via said virtual port to a first format substantially complying with said protocol, and converts incoming data substantially complying with said protocol into a second format compatible by said bus and said legacy application, said incoming data transmitted over said wireless communication network to said electronic system.

22. The electronic system as described in claim 16, wherein said bus is taken from a group comprising:
   a Peripheral Component Interconnect (PCI) bus;
   a Personal Computer Memory Card International Association (PCMCIA) bus;
   a Universal Serial Bus (USB); and
   an IEEE 1394 bus.

23. The electronic system as described in claim 16, wherein said virtual serial communication port and said interface device substantially comply with a Windows (TM) driver model.

24. A method of communication over a wireless communication network by a legacy application on a computer system, the method comprising:
   a) creating a virtual serial communication port on said computer system;
   b) emulating a physical serial communication port with said virtual serial communication port;
   c) converting outgoing data from said legacy application located on said computer system via said virtual serial communication port into a first format substantially complying with a protocol associated with said wireless communication network; and
   d) converting incoming data substantially complying with said protocol into a second format understood by said computer system and said legacy application, said incoming data transmitted over said wireless communication network to said computer system.

25. The method as described in claim 24, wherein step d) further comprises:
   converting said incoming data into a parallel format.

26. The method as described in claim 24, further comprising:
   e) identifying said virtual serial communication port by an operating system of said computer system upon booting up said operating system; and
   f) initializing said virtual serial communication port by said operating system.

27. The method as described in claim 24, wherein said step a) further comprises:
   a1) creating a virtual port functional device object (FDO) for providing basic port management of said virtual serial communication port, said virtual port FDO substantially complying with a Windows (TM) driver model (WDM model); and
   a2) creating a virtual port physical device object (PDO) for representing-said virtual port to a bus on said computer system, said virtual port PDO substantially complying with said WDM model.

28. The method as described in claim 27, wherein said step a) further comprises:
   a3) creating an interface device functional device object (FDO) for representing an interface device to a driver of said interface device, said interface device FDO substantially complying with a Windows (TM) driver model (WDM model), said interface device creating and managing said virtual serial communication port; and
   a4) an interface device physical device object (PDO) for representing said interface device to said bus, said interface device PDO substantially complying with said WDM model.

29. The method as described in claim 28, wherein said step c) further comprises:
- c1) receiving said outgoing data from said legacy application, via said virtual port FDO and said virtual port PDO, at said interface device FDO;
- c2) sending said outgoing data to an interface application, said interface application converting said outgoing data to said first format;
- c3) sending said outgoing data of said first format to a software stack associated with said protocol;
- c4) sending said outgoing data of said first format to a transport stack associated with said protocol;
- c5) sending said outgoing data of said first format to said interface device FDO;
- c6) sending said outgoing data of said first format to said interface device PDO; and
- c6) sending said outgoing data of said first format over said wireless communication network.

30. The method as described in claim 28, wherein said step d) further comprises:
- d1) receiving said incoming data from said wireless communication network at said interface device PDO;
- d2) sending said incoming data to said interface device FDO;
- d3) sending said incoming data to a transport stack associated with said protocol;
- d4) sending said incoming data to a software stack associated with said protocol;
- d5) sending said incoming data to an interface application, said interface application converting said incoming data to said second format;
- d6) sending said incoming data of said second format to said interface device FDO;
- d7) sending said incoming data of said second format to said legacy application via said virtual port PDO and said virtual port FDO.

31. The method as described in claim 30, wherein said interface device is a PC Card substantially complying with a version of the Personal Computer Memory Card International Association (PCMCIA) standard.

32. The method as described in claim 30, wherein said interface device is a Universal Serial Bus (USB) device.

33. The method as described in claim 24, wherein step d) further comprises:
- converting said outgoing data transmitted from said virtual serial port into said first format substantially complying with a version of the Bluetooth wireless communication specification.

34. The method as described in claim 24, wherein said bus is taken from a group comprising:
- a Peripheral Component Interconnect (PCI) bus;
- a Personal Computer Memory Card International Association (PCMCIA) bus;
- a Universal Serial Bus (USB); and
- an IEEE 1394 bus.

35. The method as described in claim 24, further comprising:
- creating a second virtual communication port that is associated with a second legacy application for emulating a second physical serial communication port, wherein said interface device maps incoming data to the appropriate serial communication port and maps outgoing data to the appropriate remote electronic device.

* * * * *